(12) United States Patent
Lai

(10) Patent No.: US 11,678,309 B2
(45) Date of Patent: Jun. 13, 2023

(54) CHANNEL STATE INFORMATION REPRESENTATION METHOD AND RECEIVING APPARATUS

(71) Applicant: Wistron Corporation, New Taipei (TW)

(72) Inventor: Cheng-Chia Lai, New Taipei (TW)

(73) Assignee: Wistron Corporation, New Taipei (TW)

( * ) Notice: Subject to any disclaimer, the term of this patent is extended or adjusted under 35 U.S.C. 154(b) by 119 days.

(21) Appl. No.: 17/203,711

(22) Filed: Mar. 16, 2021

(65) Prior Publication Data

US 2022/0232561 A1 Jul. 21, 2022

(30) Foreign Application Priority Data

Jan. 19, 2021 (TW) ................................. 110101880

(51) Int. Cl.
*H04W 72/0446* (2023.01)
*H04L 5/00* (2006.01)

(52) U.S. Cl.
CPC ....... *H04W 72/0446* (2013.01); *H04L 5/0057* (2013.01)

(58) Field of Classification Search
USPC ......................................................... 370/336
See application file for complete search history.

(56) References Cited

U.S. PATENT DOCUMENTS

| | | | |
|---|---|---|---|
| 7,359,311 B1* | 4/2008 | Paranjpe | H04L 1/20 370/329 |
| 9,344,299 B2 | 5/2016 | Seo | |
| 9,825,732 B1* | 11/2017 | Yang | H04J 11/0036 |
| 2007/0116141 A1* | 5/2007 | Li | H04L 25/03292 375/350 |
| 2007/0258352 A1* | 11/2007 | Wang | H04L 1/0057 370/203 |
| 2007/0298728 A1* | 12/2007 | Imamura | H04L 5/0046 455/77 |
| 2013/0286863 A1* | 10/2013 | Silverman | H04L 5/0039 370/252 |
| 2015/0018034 A1* | 1/2015 | Nagata | H04L 5/0073 455/524 |
| 2016/0277529 A1* | 9/2016 | Chen | H04L 67/306 |
| 2018/0123654 A1* | 5/2018 | Park | H04W 72/0413 |
| 2019/0175074 A1* | 6/2019 | Zhang | H04B 7/22 |
| 2019/0181936 A1* | 6/2019 | Park | H04W 76/27 |
| 2020/0382228 A1 | 12/2020 | Studer | |
| 2022/0007139 A1* | 1/2022 | Li | G06N 5/04 |

* cited by examiner

*Primary Examiner* — Hassan Kizou
*Assistant Examiner* — Oladiran Gideon Olaleye
(74) *Attorney, Agent, or Firm* — Winston Hsu

(57) ABSTRACT

A representation method of channel state information for a receiving apparatus of a wireless communication system is disclosed. The channel state information includes a plurality of subcarrier data. The representation method of channel state information includes mapping each subcarrier data captured at a first timing onto planar component vectors; and respectively accumulating the planar component vectors corresponding to an identical direction of each subcarrier data captured at the first timing to generate a characteristic chart of channel state.

2 Claims, 5 Drawing Sheets

$$H = \begin{bmatrix} -17+25i & 34-22i & 17-17i & 2+20i & 4+4i & -15-15i \\ 23+8i & -20-35i & -12-15i & 24-6i & 5-2i & -13+21i \\ 23-23i & -40+11i & -19+13i & 5-32i & 5-6i & 18+25i \\ -17-38i & -9+43i & 7+24i & -28-22i & -7-11i & 33-7i \\ -41-9i & 39+38i & 27+13i & -41+18i & -18-1i & 9-41i \\ -16+29i & 50-9i & 20-9i & -4+38i & 1+19i & -27-20i \end{bmatrix}$$

CHANNEL STATE INFORMATION REPRESENTATION METHOD AND RECEIVING APPARATUS

BACKGROUND OF THE INVENTION

1. Field of the Invention

The present invention relates to a representation method of channel state information and a related receiving apparatus, and more particularly, to a representation method of channel state information and a related receiving apparatus capable of presenting channel state information rapidly.

2. Description of the Prior Art

A conventional wireless communication system such as Wi-Fi often takes a received signal strength indicator (RSSI) of a wireless signal as an important index for evaluating connection quality. Alternatively, the RSSI may be utilized for measuring wireless signal strength of access points (AP), which may be taken as an index for handoff or positioning. Since RSSI often undergoes huge variations, the accuracy of the service is affected: for example, when the AP performs a triangulation positioning, the huge variation in RSSI results in a huge offset when positioning.

A prior art improvement to the above problem is to determine more effective parameters that can spontaneously describe a wireless signal status of a mobile device. More specifically, a modulation method of the physical layer of the conventional wireless network standard IEEE802.11ax (i.e. WiFi6) adopts a Multi-input Multi-output Orthogonal frequency-division multiplexing (MIMO-OFDMA) technique. In order to realize the above wireless connection technique, preambles of Physical Layer Convergence Protocol (PLCP) of IEEE 802.11 include a channel frequency response, which includes channel state information (CSI). The channel state information comprises amplitudes and phases of subcarriers and may be taken as an index for measuring the wireless signal. In addition, the channel state information may be utilized for describing how the wireless signal is affected between a transmitting apparatus and a receiving apparatus via a channel, e.g. scattering or attenuation, and can therefore be used to adapt the channel environment to improve the reliability of wireless communication system. The conventional channel state information, however, comprises a lot of information which thereby increases computation complexity. An improvement to the conventional technique is necessary.

SUMMARY OF THE INVENTION

The present invention provides a representation method of channel state information and a related receiving apparatus, which can rapidly present the channel state information to reduce the complexity of processing the wireless signal.

An embodiment of the present invention discloses a representation method of channel state information for a receiving apparatus of a wireless communication system, wherein the channel state information includes a plurality of subcarrier data, and the representation method of channel state information comprises: mapping each subcarrier data captured at a first timing onto planar component vectors; and respectively accumulating the planar component vectors corresponding to an identical direction of each subcarrier data captured at the first timing to generate a characteristic chart of channel state.

Another embodiment of the present invention discloses a receiving apparatus for a wireless communication system, comprising: a processing unit, configured to receive a wireless signal from a transmitting apparatus and obtain channel state information of the wireless signal, wherein the channel state information includes a plurality of subcarrier data; wherein the processing unit of the receiving apparatus is configured to map each subcarrier data captured at a first timing onto planar component vectors, and respectively accumulate the planar component vectors corresponding to an identical direction of each subcarrier data captured at the first timing to generate a characteristic chart of channel state.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram of a subcarrier matrix according to an embodiment of the present invention.

DETAILED DESCRIPTION

Figure 1:
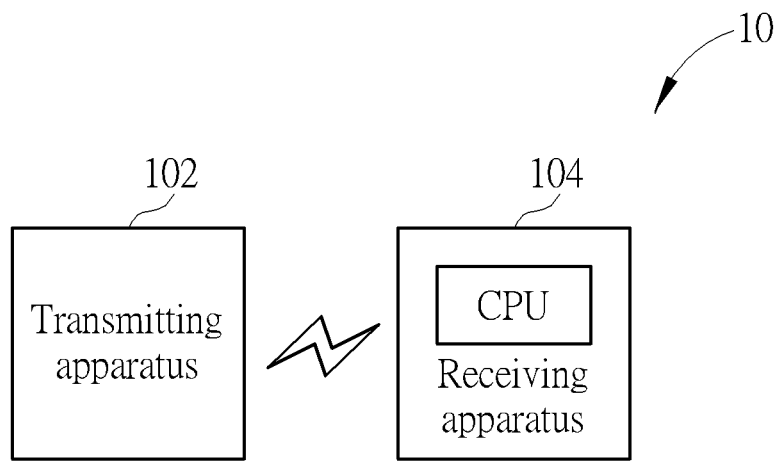
FIG. 1 is a schematic diagram of a wireless communication system according to an embodiment of the present invention.

Refer to FIG. 1, which is a schematic diagram of a wireless communication system 10 according to an embodiment of the present invention. The wireless communication system 10 includes a transmitting apparatus 102 and a receiving apparatus 104 for wireless network standards, e.g. IEEE 802.11 or IEEE 802.11ax. The transmitting apparatus 102 is configured to transmit a wireless signal, e.g. a signal transmitter of a user equipment (UE) or a wireless access point (AP). The receiving apparatus 104 includes a processing unit (the CPU) for receiving the wireless signal from the transmitting apparatus 102 and obtaining channel state information of the wireless signal from the signal transmitter of the UE or the AP, wherein the channel state information includes a plurality of subcarrier data. The receiving apparatus 104 is configured to map each subcarrier data captured at a first timing onto planar component vectors and respectively accumulate the planar component vectors corresponding to an identical direction of each subcarrier data captured at the first timing to generate a characteristic chart of channel state. The wireless communication system 10 according to an embodiment of the present invention maps the subcarrier data of the channel state information onto the planar component vectors to determine the characteristic chart corresponding to different channel state information. Therefore, the wireless communication system 10 according to an embodiment of the present invention may reduce the complexity when computing the channel state information and reduces computation complexity of the system.

Figure 2:
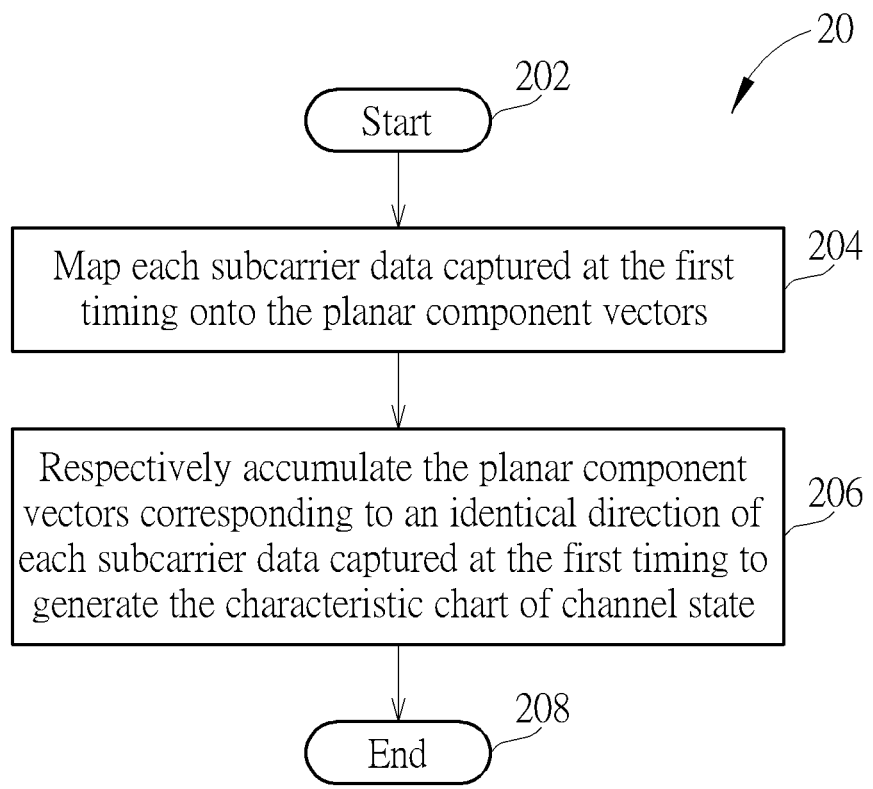
FIG. 2 is a schematic diagram of a representation method of channel state information according to an embodiment of the present invention.

In detail, refer to FIG. 2, which is a schematic diagram of a representation method 20 of channel state information according to an embodiment of the present invention. The representation method 20 of the channel state information may be applied to the receiving apparatus 104 of the wireless communication system 10 to determine the corresponding subcarrier data of the wireless signal transmitted by the transmitting apparatus 102. The representation method 20 of the channel state information includes the following steps:

Step 202: Start.

Step 204: Map each subcarrier data captured at the first timing onto the planar component vectors.

Step 206: Respectively accumulate the planar component vectors corresponding to an identical direction of each subcarrier data captured at the first timing to generate the characteristic chart of channel state.

Step 208: End.

Based on the representation method 20 of the channel state information, the processing unit CPU of the receiving apparatus 104 according to an embodiment of the present invention may receive the subcarrier data of the channel state from the wireless signal transmitted by the transmitting apparatus 102 and map each subcarrier data at the same timing point onto the planar component vectors. In an embodiment, the planar component vectors are composed of eight planar component vectors with fixed directions, e.g. a 45-degree angle exists between each of the eight planar component vectors on the plane from a center point.

Figure 4:
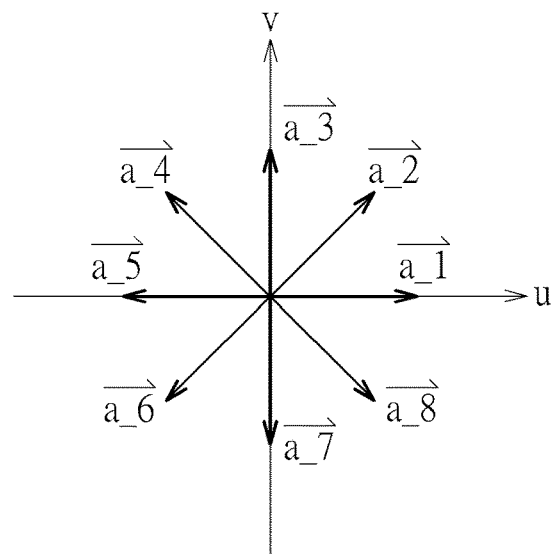
FIG. 4 is a schematic diagram of planar component vectors on a plane according to an embodiment of the present invention.
Figure 5:
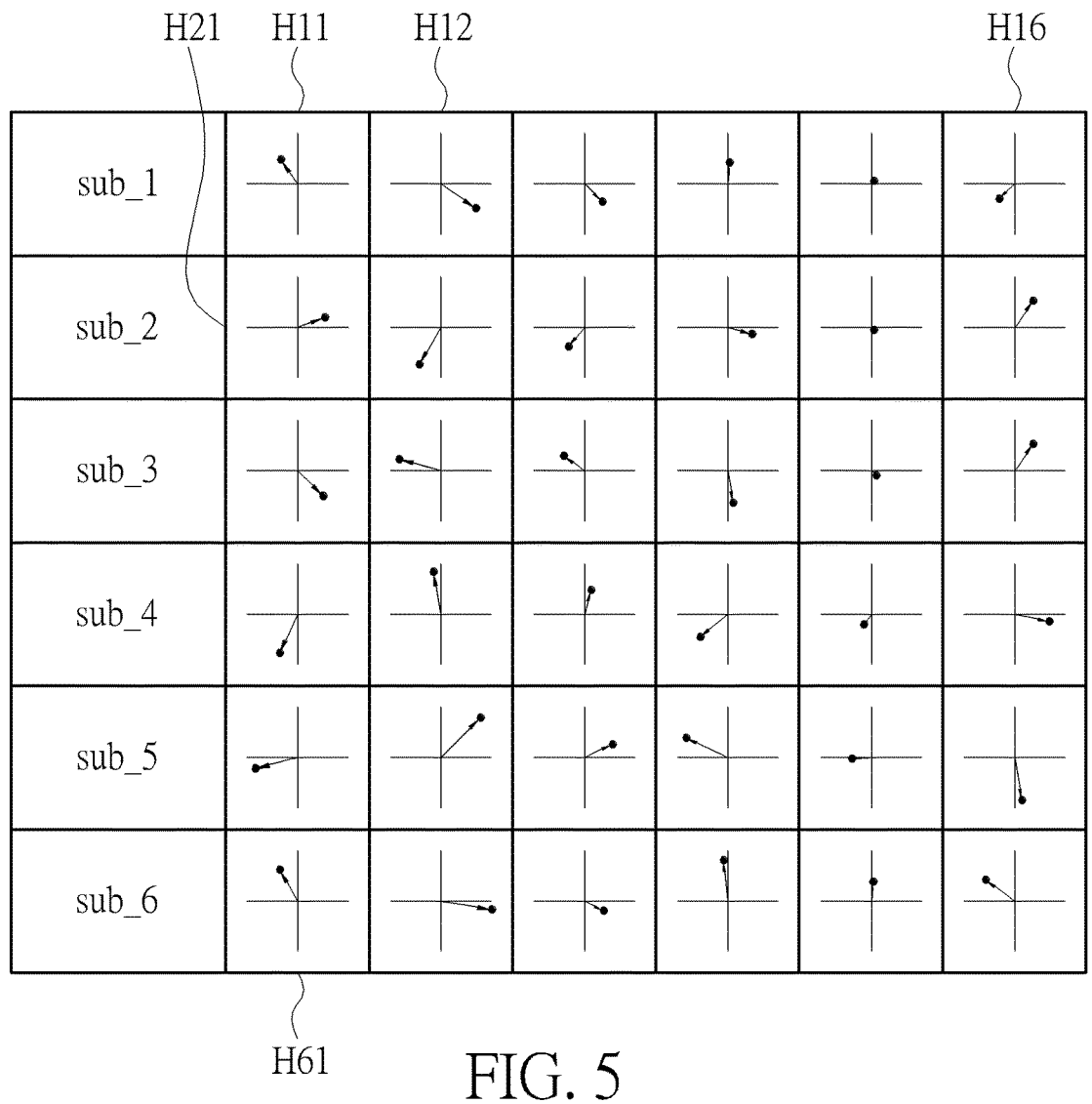
FIG. 5 is a schematic diagram of planar component vectors of subcarrier data of a subcarrier matrix according to an embodiment of the present invention.

More specifically, taking a transceiver comprising three sets of receiving antenna and two sets of transmitting antenna as an example, the transceiver may receive a data matrix with 30 sets of subcarrier data for each transmission. In this example, a subcarrier matrix H in FIG. 3 is composed of six sets of subcarrier data sub_1-sub_6. Each subcarrier data sub_1-sub_6 includes a real part and an imaginary part, wherein the real part represents amplitude of the subcarrier data and the imaginary part represents a phase of the subcarrier data. FIG. 4 is a schematic diagram of component vectors on a plane UV according to an embodiment of the present invention. As shown in FIG. 4, each element of the subcarrier matrix H may be mapped onto vectors $\overrightarrow{a\_1}$ - $\overrightarrow{a\_8}$. In this way, other elements of the subcarrier matrix H, i.e. each subcarrier data, may be sequentially divided into eight planar component vectors, i.e. the vectors $\overrightarrow{a\_1}$ - $\overrightarrow{a\_8}$. FIG. 5 is a schematic diagram of the planar component vectors of subcarrier data of the subcarrier matrix H according to an embodiment of the present invention.

Figure 6:
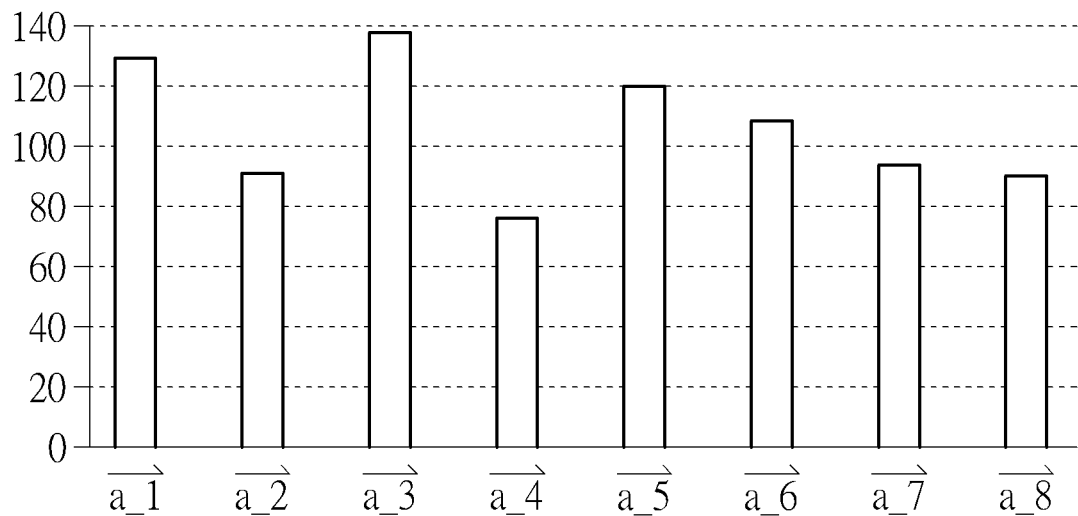
FIG. 6 is a schematic diagram of a characteristic chart of channel state according to an embodiment of the present invention.

In step 206, the processing unit CPU may accumulate the planar component vectors corresponding to the identical direction of each subcarrier data of the subcarrier matrix H to generate the characteristic chart of channel state. FIG. 6 is a schematic diagram of a characteristic chart of channel state according to an embodiment of the present invention. As shown in FIG. 6, the characteristic chart of the channel state shows values of the accumulated planar component vectors corresponding to different directions of the subcarrier data, i.e. the values of the vectors $\overline{a\_1}$ - $\overline{a\_8}$ of each subcarrier of the subcarrier matrix H.

Therefore, the characteristic chart of the channel state in FIG. 6 may represent the channel state information at a specific timing.

In another embodiment, the processing unit CPU may map each subcarrier data captured at a second timing onto the planar component vectors, wherein the planar component vectors are composed of eight component vectors with fixed directions, and determine a difference between the planar component vectors corresponding to the first timing and the second timing to generate the characteristic chart of channel state. The characteristic chart of the channel state obtained in this embodiment may represent a variation of the channel state between the first timing and the second timing.

Since the wireless communication system 10 according to an embodiment of the present invention may rapidly present channel state information or a channel response descriptor, a similar channel response descriptor may be determined accordingly to determine the corresponding channel state.

Figure 7:
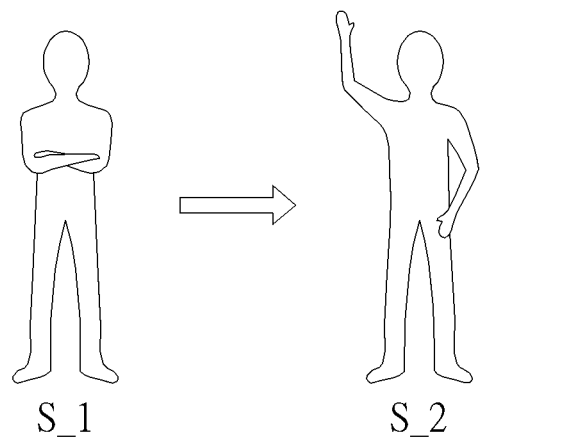
FIG. 7 is a schematic diagram of a usage scenario according to an embodiment of the present invention.
Figure 7:
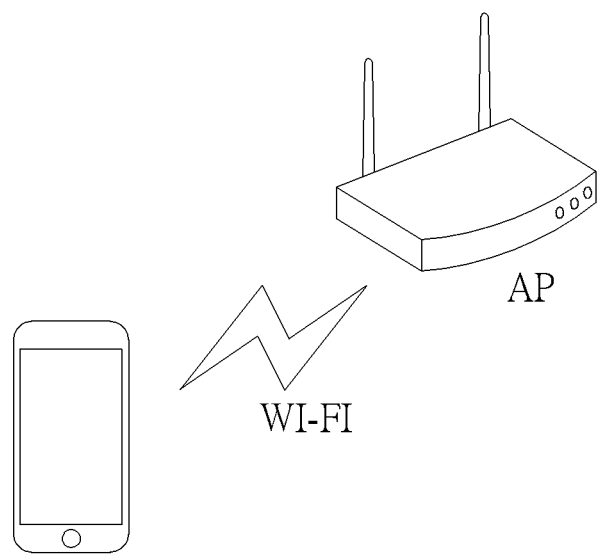

In detail, refer to FIG. 7, which is a schematic diagram of a usage scenario according to an embodiment of the present invention. Since the wireless communication system 10 may obtain the characteristic chart of the channel state corresponding to different channel states in advance according to the representation method 20 of the channel state information. In the scenario shown in FIG. 7, the wireless communication system 10 may capture real-time characteristic charts of the channel state with a status S_1 (i.e. a still man) and a status S_2 (i.e. a man waving his hand) according to the representation method 20 of the channel state information. Then, the real-time characteristic charts of the channel states are respectively compared with a predetermined characteristic chart of the channel state (which is captured in advance) to determine whether the real-time characteristic charts of the channel state match the predetermined characteristic chart of the channel state.

For example, the processing unit CPU of the wireless communication system 10 according to an embodiment of the present invention may calculate a first Euclidean distance between the real-time characteristic chart of the channel state corresponding to the status S_1 and the predetermined characteristic chart of the channel state, or calculate a second Euclidean distance between the real-time characteristic chart of the channel state corresponding to the status S_2 and the predetermined characteristic chart of the channel state, so as to determine whether the first Euclidean distance or the second Euclidean distance is smaller than or equal to a threshold to determine whether the real-time characteristic charts of the channel state corresponding to the status S_1 or the status S_2 conforms to the characteristics of the predetermined characteristic chart of the channel state. For example, the processing unit CPU of the wireless communication system 10 according to an embodiment of the present invention calculates the first Euclidean distance between each of the subcarrier data corresponding to the status S_1 and the predetermined characteristic chart of the channel state. When the first Euclidean distance is smaller than or equal to the threshold, the planar component vectors mapped from the subcarrier data conform to the characteristics of the predetermined characteristic chart of the channel state. In contrast, when the first Euclidean distance is greater than the threshold, the planar component vectors mapped from the subcarrier data do not conform to the characteristics of the predetermined characteristic chart of the channel state. Similarly, a matching status between the subcarrier data of the status S_1, the status S_2 and the predetermined characteristic chart of the channel state is determined.

In this embodiment, since thirty-six elements in the subcarrier matrix H may be simplified to the planar component vectors with eight fixed directions, the subcarrier matrix H with thirty sets of subcarrier data, which includes one hundred and eighty subcarrier data, may be reduced to the characteristic chart of the channel state with five sets of the planar component vectors of eight fixed directions. Thus, the wireless communication system 10 according to an embodiment of the present invention may further determine that the characteristics of the channel state match the predetermined characteristics of the channel state when a specific ratio of the characteristics of the channel state to the predetermined characteristics of the channel state of the subcarrier data is reached. In other words, when the specific ratio is 70%, twenty-eight planar component vectors out of five sets of the eight fixed directions of the characteristic chart of the channel state conform to the predetermined characteristic chart of the channel state (i.e. the Euclidean distance corresponding to the channel state is smaller than or equal to the threshold), the corresponding status conforms to the characteristic of the characteristic chart of the channel state. Therefore, when the above status S_1 or status S_2 respectively conforms to the predetermined characteristic chart of the channel state, the wireless communication system 10 according to an embodiment of the present invention may rapidly represent the channel environment of the status S_1 and the status S_2.

Similarly, the wireless communication system 10 according to an embodiment of the present invention may take a difference of planar component vectors corresponding to two different timings as a predetermined characteristic chart of the channel state for determining the characteristics of the real-time channel state.

Figure 8:
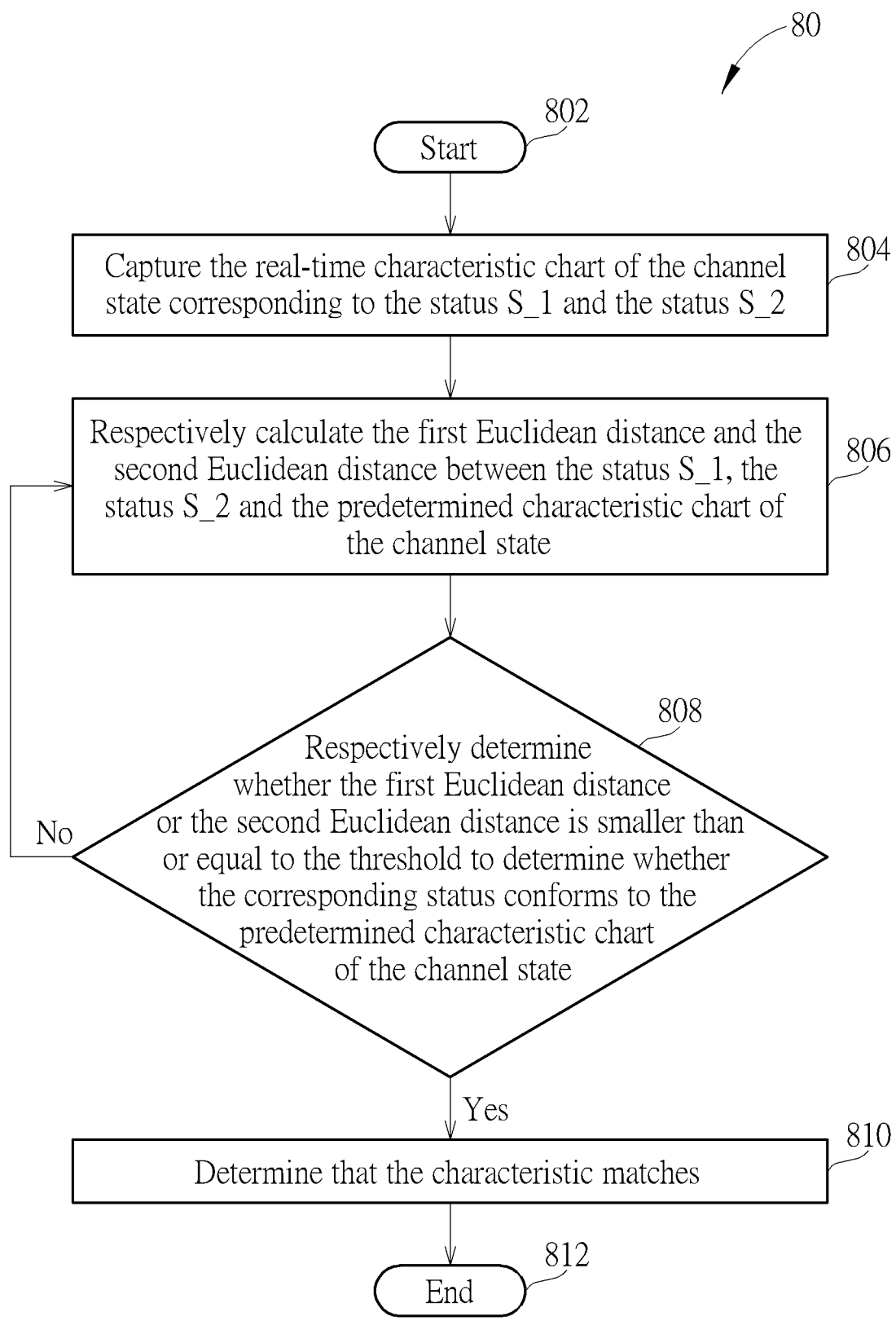
FIG. 8 is a schematic diagram of a matching method according to an embodiment of the present invention.

An operation of determining whether the channel state conforms to the characteristic chart of the channel state may be summarized as a matching method 80, as shown in FIG. 8. The matching method 80 includes the following steps:

Step 802: Start.

Step 804: Capture the real-time characteristic chart of the channel state corresponding to the status S_1 and the status S_2.

Step 806: Respectively calculate the first Euclidean distance and the second Euclidean distance between the status S_1, the status S_2 and the predetermined characteristic chart of the channel state.

Step 808: Respectively determine whether the first Euclidean distance or the second Euclidean distance is smaller than or equal to the threshold to determine whether the corresponding status conforms to the predetermined characteristic chart of the channel state. If yes, go to step 810; if no, go to step 806.

Step 810: Determine that the characteristic matches.

Step 812: End.

Refer to the embodiments of the wireless communication system 10 mentioned above for the operation process of the matching method 80, which is not narrated herein for brevity.

It should be noted that, although the above embodiments are provided to illustrate the concept of the present invention, those skilled in the art may make modifications to the present invention based on different requirements, which are not limited thereto. For example, the way to map the subcarrier data onto the planar component vectors with fixed directions, the threshold to determine the first Euclidean distance or the second Euclidean distance, and the specific ratio for determining the match status of the characteristic chart of the channel state may all be modified according to requirements of a user or the computer system. These modifications are not limited thereto, and also belong to the scope of the present invention.

In summary, the present invention provides a representation method of channel state information and a related receiving apparatus to rapidly present the channel state information, which can reduce the complexity of processing the wireless signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A representation method of channel state information for a receiving apparatus of a wireless communication system, wherein the channel state information includes a plurality of subcarrier data, the representation method of channel state information comprising:

mapping each subcarrier data captured at a first timing onto planar component vectors;

respectively accumulating the planar component vectors corresponding to an identical direction of each subcarrier data captured at the first timing to generate a characteristic chart of channel state;

calculating a first Euclidean distance between a first subcarrier datum corresponding to a first status and the characteristic chart of channel state;

determining whether the first subcarrier datum corresponding to the first status conforms to a characteristic of the characteristic chart of channel state by determining whether the first Euclidean distance is smaller than a first threshold;

mapping each subcarrier data captured at a second timing onto planar component vectors;

determining a difference between the planar component vectors corresponding to the first timing and the second timing to generate the characteristic chart of channel state;

calculating a second Euclidean distance between a second subcarrier datum corresponding to a second status and the characteristic chart of channel state; and determining whether the second subcarrier datum corresponding to the second status conforms to a characteristic of the characteristic chart of channel state by determining whether the second Euclidean distance is smaller than a second threshold;

wherein the planar component vectors are composed of eight planar component vectors with fixed direction.

2. A receiving apparatus for a wireless communication system, comprising:

a processing unit, configured to receive a wireless signal from a transmitting apparatus and obtain channel state information of the wireless signal, wherein the channel state information includes a plurality of subcarrier data; the processing unit of the receiving apparatus is configured to map each subcarrier data captured at a first timing onto planar component vectors; respectively accumulate the planar component vectors corresponding to an identical direction of each subcarrier data captured at the first timing to generate a characteristic chart of channel state; calculate a first Euclidean distance between a first subcarrier datum corresponding to a first status and the characteristic chart of channel state; and determine whether the first subcarrier datum corresponding to the first status conforms to a characteristic of the characteristic chart of channel state by determining whether the first Euclidean distance is smaller than a first threshold; map each subcarrier data captured at a second timing onto planar component vectors; and to determine a difference between the planar component vectors corresponding to the first timing and the second timing to generate the characteristic chart of channel state; calculate a second Euclidean distance between a second subcarrier datum corresponding to a second status and the characteristic chart of channel state; and determine whether the second subcarrier datum corresponding to the second status conforms to a characteristic of the characteristic chart of channel state by determining whether the second Euclidean distance is smaller than a second threshold;

wherein the planar component vectors are composed of eight planar component vectors with fixed direction.

\* \* \* \* \*